United States Patent [19]
Goldberg

[11] Patent Number: 5,301,360
[45] Date of Patent: Apr. 5, 1994

[54] DIGITAL OPTION SELECT SYSTEM

[75] Inventor: Arthur M. Goldberg, North Lauderdale, Fla.

[73] Assignee: Motorola, Inc., Schaumburg, Ill.

[21] Appl. No.: 696,416

[22] Filed: May 6, 1991

[51] Int. Cl.$^5$ .................. H04B 17/02; H04B 1/40
[52] U.S. Cl. ...................... 455/67.4; 455/88;
455/89; 340/825.57
[58] Field of Search .......... 455/67.1, 67.4, 88,
455/74, 89, 226.1, 68; 379/58, 59, 60, 63, 61,
441–442, 447; 340/509, 511, 512, 505, 825.57,
825.59, 825.6, 825.63, 825.64, 825.42, 825.54;
381/96

[56] References Cited

U.S. PATENT DOCUMENTS

| | | | |
|---|---|---|---|
| 4,431,790 | 6/1990 | Kobayashi et al. | 340/825.57 |
| 4,459,591 | 7/1984 | Heubner et al. | 340/825.57 |
| 4,608,562 | 8/1986 | Nunor et al. | 340/825.59 |
| 4,618,853 | 10/1986 | Yuchi | 340/505 |
| 4,719,461 | 1/1988 | Keller | 340/825.57 |
| 4,792,986 | 12/1988 | Garner et al. | 455/89 |
| 4,856,081 | 8/1989 | Smith | 340/825.57 |
| 4,949,384 | 8/1990 | Noro et al. | 381/96 |
| 5,125,107 | 6/1992 | Herold et al. | 455/226.1 |
| 5,164,652 | 11/1992 | Johnson et al. | 455/89 |

*Primary Examiner*—Reinhard J. Eisenzopf
*Assistant Examiner*—Lisa Charouel
*Attorney, Agent, or Firm*—Michael Buchenhorner; Pedro P. Hernandez

[57] ABSTRACT

A communication device (10) comprises a coupler (19) for coupling an external device (30) to the communication device, and controller (16) for controlling the communication device. The controller has at least first and second terminals (22 and 23) for receiving digital numbers from the external device, each digital number representing a mode of operation for the communication device. The controller also includes an apparatus for transmitting a test pulse to the external device, and an apparatus for receiving a response pulse in response to the test pulse. The response pulse has predetermined direction, duration and polarity indicating a mode of operation for the communication device.

21 Claims, 3 Drawing Sheets

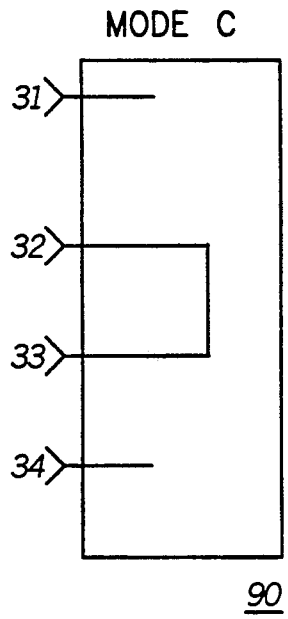
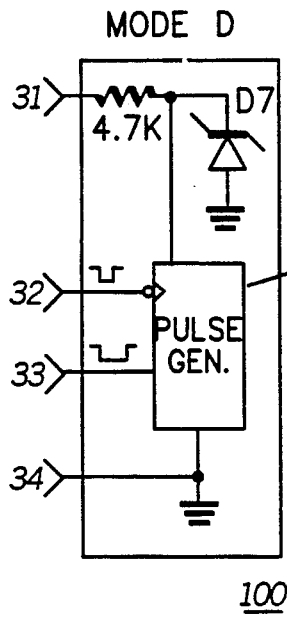
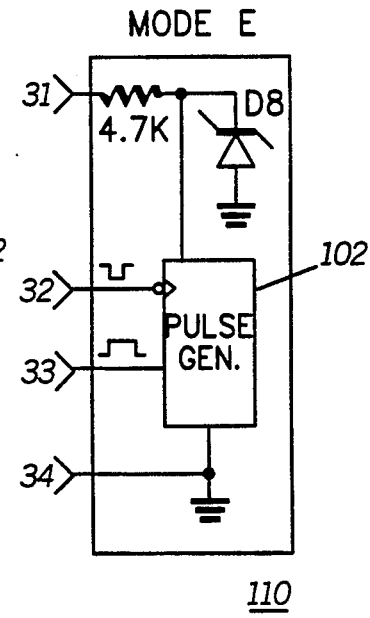
FIG.8  FIG.9  FIG.10
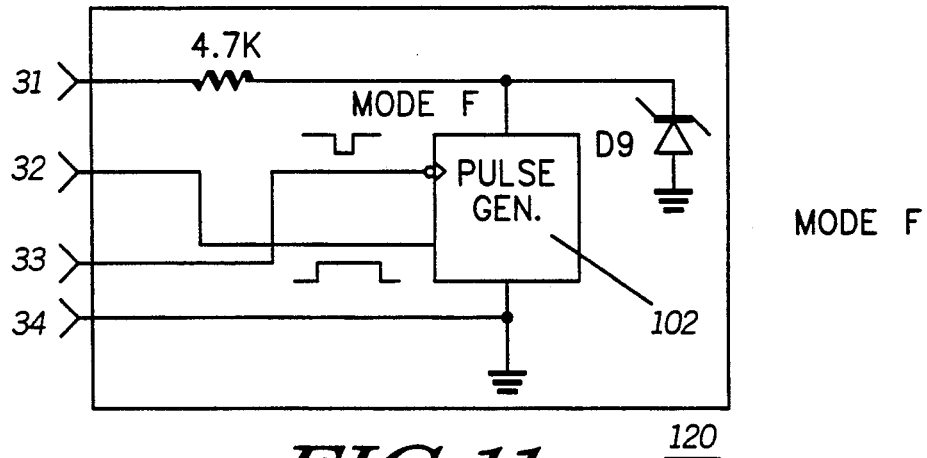
FIG.11
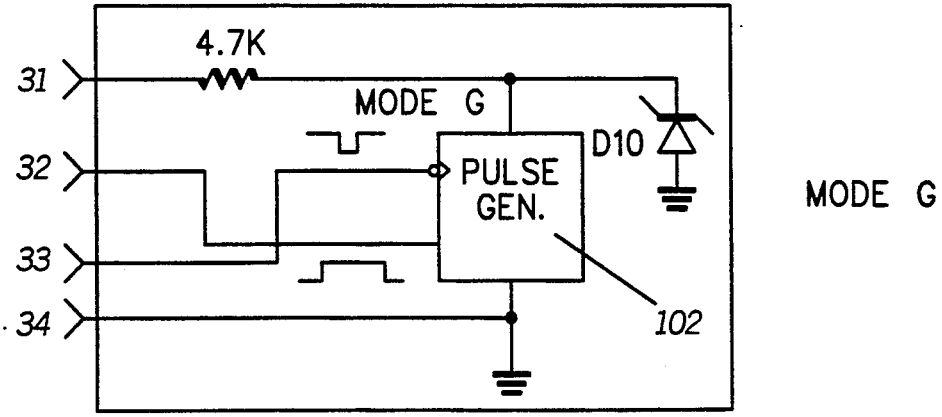
FIG.12

DIGITAL OPTION SELECT SYSTEM

TECHNICAL FIELD

This invention relates generally to radio communication devices and more specifically to a device for selecting options in radio communication devices.

BACKGROUND

Modern portable radios commonly feature compatibility with several accessories which may be connected to the radio, such as external microphones, speakers, or even personal computers. Such compatibility requires some means for connecting the internal circuitry of the radio to the circuitry of the external accessory. In addition, when an accessory is connected to the radio it becomes necessary to inform the control means of the radio of the accessory that has been connected, so that the operation of the radio can be adjusted accordingly.

Apparatus for selecting modes of operation for a radio depending on the external device connected to the radio are known. For instance, U.S. Pat. No. 4,792,986, to Garner, describes an option selection scheme using analog voltages, with an impedance device determining the voltage for an option. Each option would in turn use a different impedance, and thus generate a different voltage. There are, however, some serious limitations to this scheme. While the above scheme theoretically could have an infinite number of discrete voltages, practical limitations severely limit it. With the resolution available with low cost Analog-to-Digital convertors, and the noise present in the radio environment, only about 4 discrete levels are usable with voltage "windows." Further, conductive contamination of the option connector can cause false readings and errors. Thus, a need exists for apparatus for identifying the external accessory for the radio.

SUMMARY OF THE INVENTION

Briefly, according to the invention, a communication device overcomes the detriments of the prior art by using binary digital signals to detect and identify an external device connected to the communication device, and accordingly selecting a mode of operation.

BRIEF DESCRIPTION OF THE DRAWINGS

FIGS. 2-12 illustrate several possible optional accessory-identification circuits that may be used in conjunction with the radio of FIG. 1.

DETAILED DESCRIPTION OF THE PREFERRED EMBODIMENT

Figure 1:
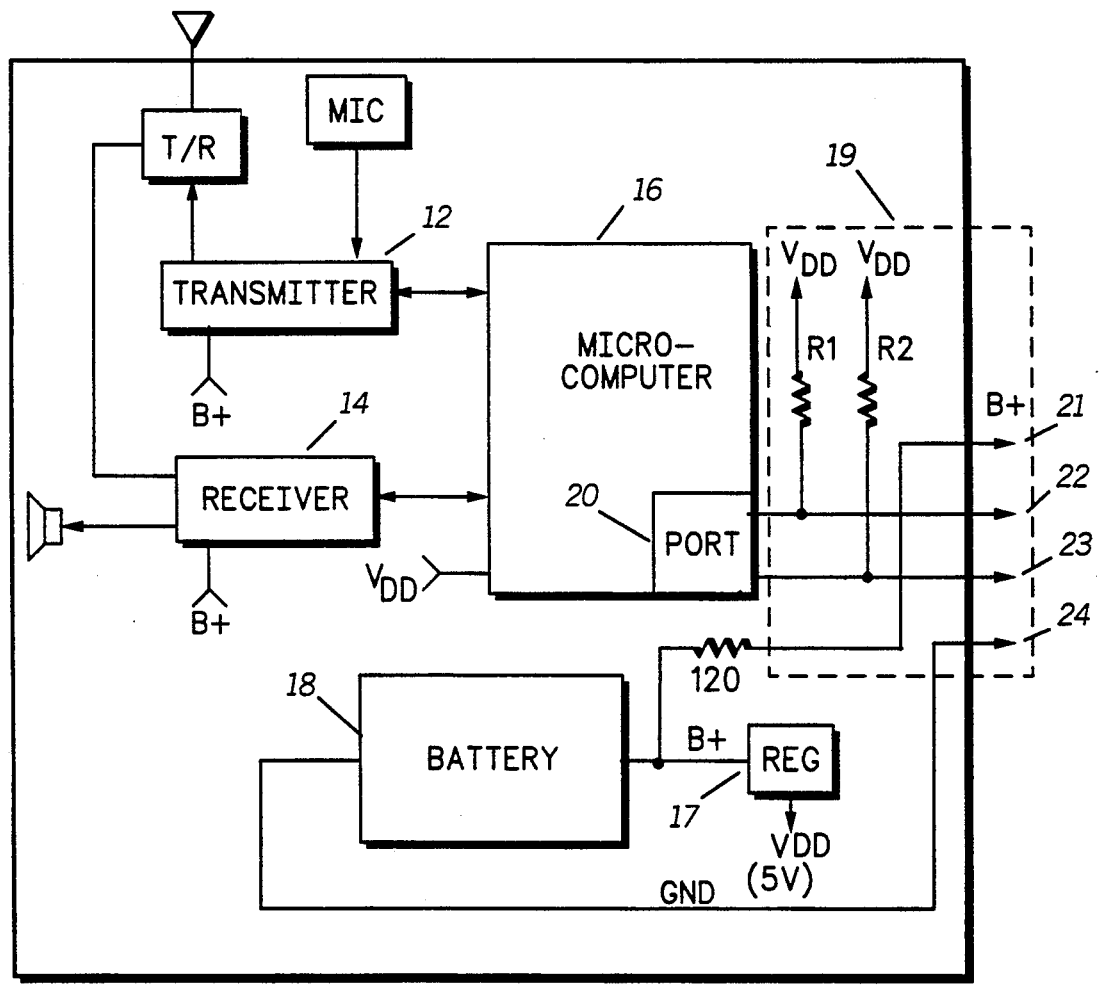
FIG. 1 is a block diagram of a radio having digital option selection and detection circuitry in accordance with the invention.
Figure 2:
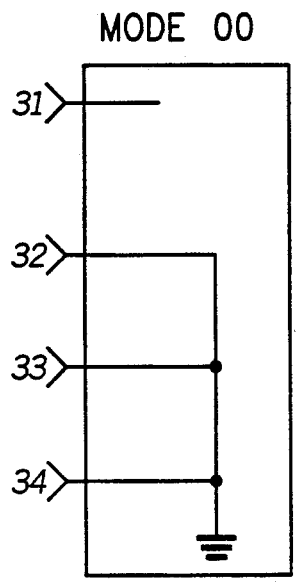

Referring to FIG. 1, there is shown a block diagram of a radio 10 having digital option selection and detection circuitry in accordance with the invention. The option selection and detection circuitry combines time, data direction, polarity, logic level, and microcomputer control to provide an almost unlimited number of operational states for the radio 10. The radio 10 includes a conventional radio transmitter section 12, a conventional radio receiver section 14, a microcontroller (e.g., a micro-computer or microprocessor) 16 for controlling the operation of the radio 10, and a connector circuit 19 for connecting to external devices. The connector circuit 19 operates in conjunction with the microcontroller 16 to select a mode of operation for the radio 10, in accordance with the optional external device connected to the radio 10. The microcontroller 16 has a digital bidirectional port 20 (which is typical in most microcontrollers) with at least two terminals 22 and 23 for connecting to an (optional) external device. Terminal 22 is designated as bit 0, and terminal 23 as bit 1. The connector portion 19 includes the terminals 22 and 23, a supply voltage terminal 21, and a ground potential terminal 24 (provided on the same side of the radio). Thus, only two bits of the bidirectional port 20 are required. The connector portion 19 also includes a pull-up resistor R1 (22 kOhms, in this embodiment) which is connected between the terminal 22, and the supply voltage, $V_{dd}$ (5 Volts, in this embodiment); and a second pull-up resistor R2 (also 22 kOhms) which is connected between the terminal 23 and $V_{dd}$. The supply voltage is preferably provided by a battery 18. A voltage regulator 17 is coupled to the battery to provide a regulated voltage $V_{dd}$.

There are three categories of operation for the connector 19. In the first category only logic levels are used to identify the external device, or accessory, connected to the radio 10. In this category, the ports 22 and 23 are configured as inputs and the microconcontroller 16 monitors the state of each port. The external device either pulls each of the terminals 22 and 23 to a logical one or zero. This provides four discrete states, or modes, one of which is the same as when no option is connected.

In a second category, three more states are identified by using data direction. The microcontroller 16 interrogates the ports 22 and 23 to determine in which directions a logic zero will propagate, thus providing three additional states.

In a third category the connector 19 works in conjunction with a pulse generator or monostable multivibrator in the external device, to provide the microcontroller 16 with the information required to identify the external device. Thus, the microcontroller 16 generates a pulse and monitors the returning information to identify the external device. The time, direction, and polarity of the returning pulses provide an almost limitless number of additional states.

Referring to FIGS. 2-12 several possible external devices (or accessories) having optional accessory-identification circuits that may be used in conjunction with the radio of FIG. 1 are illustrated. The external devices may be any of a multitude of optional accessories, such as an external speaker or microphone. Each external device has four terminals 31-34 for connecting to terminals 21-24, respectively, of the radio 10.

Logic Level Detection

Referring to FIGS. 2-5, optional external devices 30, 40, and 50 for use in conjunction with the radio 10 all operate in accordance with the first category of option detection. In the mode of operation of FIG. 2, lines 22 and 23 are pulled to ground potential creating a logic 00 state. Both lines 22 and 23 are read as zero as long as the external device remains connected to the radio 10. This would be the first mode that the microcontroller would interrogate, thus, eliminating the possible contention of configuring the port to an output, and outputting a logic one into ground potential. Therefore, if this mode is interrogated first, no hardware is required to protect against this contention.

Figure 3:
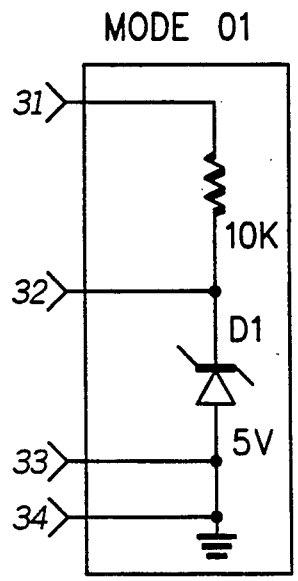

Referring to FIG. 3, another optional external device 40 for use in conjunction with the radio 10 is shown. In this mode, the device 40 pulls terminal 23 (i.e., the port for bit 1) to ground potential, and either allows terminal 22 to float high, or preferably actively pulls it high. The zener diode D1 establishes the five volt level (i.e., a logical one) at terminal 23. Therefore, a mode 01 is established. The microcontroller 16 could interrogate for this mode prior to interrogating for another mode (if supported). Again, no hardware contention exists with the line pulled to ground.

Figure 4:
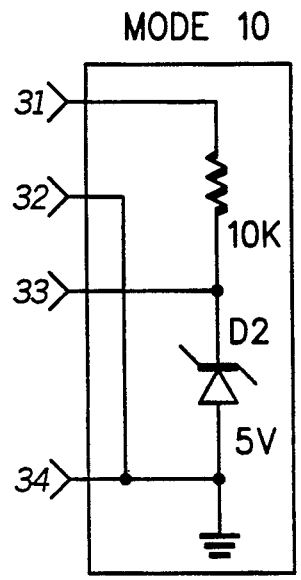

Referring to FIG. 4, there is shown a third external device 50 having logic circuitry for establishing a mode 10, which is similar to mode 01, except that bit 0 is now pulled low.

Figure 5:
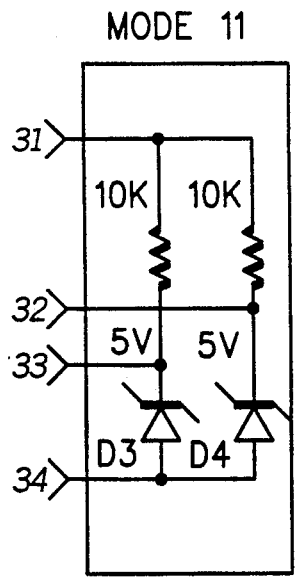

Referring to FIG. 5, a fourth external device 60 has logic circuitry for establishing a logic level sensing mode 11. Zener diodes D3 and D4 establish the 5 volts required for logic level one. In this mode, both lines are either allowed to float high, or are preferably actively pulled high. This is the mode the controlling device would normally be in with no option attached, because both lines would be pulled up internally. When the ports are configured as inputs both bits would be read as logical one (or 11). Modes A,B,C, D, and F (below) will also create the 11 pattern and must be interrogated appropriately.

Direction sensing

Figure 6:
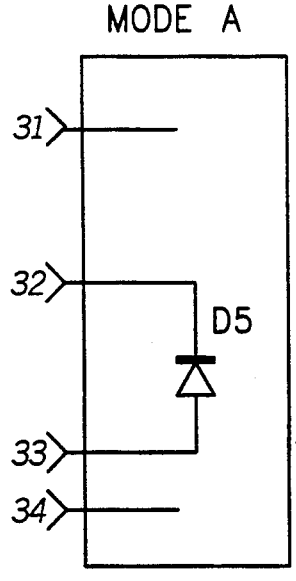
Figure 7:
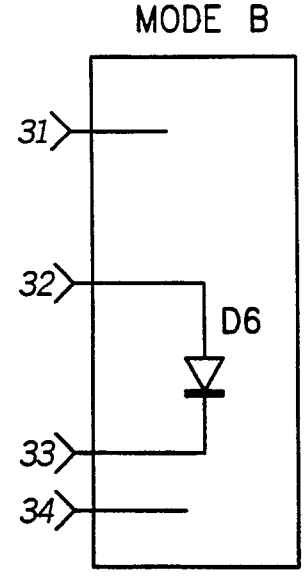

Referring to FIGS. 6, 7, and 8 modes A, B, and C (belonging to the second category) are respectively established by direction sensing. Modes A through C rely on the direction that data (or more accurately, a logical 0) can propagate. With the ports 22 and 23 configured as inputs, a logical one will be read on both ports, or 1 1. Mode A above may be determined by configuring bit 0 as an output and writing a 0 to it. If bit 1 now reads 0, the mode is either mode A or C. The process now may be reversed to differentiate between mode A and C. Thus, Bit 1 is configured as an output, and bit 0 as an input. If bit 0 remains high, mode A has been determined. If bit 0 is read as a low, mode C has been determined. Mode B operates identically to Modes A and B, except that the direction is opposite from A. In summary, mode A allows a 0 to propagate from bit 0 to bit 1 only. Mode B allows a zero to propagate from bit 1 to bit 0 only. Mode C will allow a zero to propagate in both directions. Modes A through C require only 1 component, a diode (D5 or D6, in FIGS. 6 and 7, respectively), or a jumper (in FIG. 8) in the external devices 70, 80,and 90. Mode selection is still performed through logic level selection, and should be highly immune to falsing due to contamination of the option connector contacts.

Time, Polarity, and Direction Sensing

Referring to FIGS. 9-12, a time, direction, and polarity sensing category of option selection and selection is employed. In FIG. 9, mode D is established. In mode D, time is added to logic level and data direction. A short negative pulse is applied from bit 0 of the port 20 of microcontroller 16 to an inverting input of pulse generator (e.g., a TLC555 timer or similar monostable multivibrator or timer device) 102 in external device 100. This triggers the pulse generator 102. The pulse generator 102 outputs a negative going pulse of programmed duration. The microcomputer in the microcontroller 16 determines the time duration of the returning pulse, and thus what option is selected. The pulse duration can be varied to provide multiple option selections. In theory, the number of possible time durations is actually infinite, but practical limitations reduce this. The maximum time duration would probably be less than 1 to 2 seconds, and the resolution of the timer and of the time determining mechanism used by the microcomputer is not infinite. Zener diodes D7-D10 are used to establish a logic high.

This implementation, would require time "windows" which would put a practical limitation on the number of possible states. If greater number of states are required, the timer could be replaced with a digital counter with either a crystal time base, or a ceramic resonator. This would be more costly, and other means are available to provide additional states while retaining the low cost timer circuitry.

Additional states may be determined by the properties discussed above, data direction, and the polarity of the pulses. Referring to FIG. 10, time and direction sensing mode E is illustrated. In this mode time is still a vadable, but now the returning pulse is positive. This effectively doubles the number of possible time "windows." The total number of combinations can again be doubled by using direction. The following two modes are the same as above, but in the opposite direction. The outgoing pulse is generated on bit 1, and bit 0 is monitored.

Referring to FIG. 11, there is shown an external device 120 for establishing Time, Direction, and Polarity sensing mode F. In this mode terminal 33 applies a short negative pulse to the inverting input of the pulse generator 122. The pulse generator 122 returns a positive pulse having a programmed (or predetermined) duration to bit 0.

Referring to FIG. 12, there is shown an external device 130 for establishing Time, Direction, and Polarity sensing mode G. In this mode, terminal 23 applies a short negative pulse to the inverting input of the pulse generator 122. The pulse generator 122 returns a positive pulse having a programmed duration to bit 0.

If information is available to the controlling device 16 indicating that the option selection lines are not needed, they could be reused. One very easily implemented function is to route data or other digital information through the port.

As described above, the number of possible discrete states of operation for the radio 10 is almost infinite, even when real world limitations are imposed. Moreover, the binary nature of the signals employed in this selection scheme inherently adds noise immunity, and greatly reduces the chance of falsing due to contamination of the connector.

What is claimed is:
1. A communication device comprising:
   coupler means for coupling an external device to the communication device;
   controller means for controlling the communication device, the controller means having at least first and second terminals for receiving digital numbers from the external device, each digital number representing a mode of operation for the communication device, the controller means comprising:
   means for transmitting a test pulse to the external device;
   means for receiving a response pulse from the external device; and means for establishing a mode of operation for the communication device in response to the response pulse; and the response pulse has a predetermined duration, a predetermined polarity and a predetermined direction for identifying the external device.

2. The communication device of claim 1, further comprising means for applying a supply voltage to the external device to establish a logic one level in the external device.

3. The communication device of claim 2, further comprising means for applying a ground voltage to the external device to establish a logic zero level in the external device.

4. The communication device of claim 3, further comprising radio receiver means coupled to the controller means.

5. The communication device of claim 4, further comprising ratio transmitter means coupled to the controller means.

6. A communication device comprising:
controller means for controlling the communication device;
the controller means comprising:
first and second ports;
means for transmitting a test pulse to an external device from said first port;
means for receiving a response pulse responsive to the test pulse from the external device at said second port, the response pulse having a predetermined duration, a predetermined polarity, and a predetermined direction for identifying the external device; and
means for establishing a mode of operation for the communication device in response to the response pulse.

7. The communication device of claim 6, further comprising radio receiver means coupled to the controller means.

8. The communication device of claim 7, further comprising radio transmitter means coupled to the controller means.

9. A communication device comprising:
controller means for controlling the communication device;
the controller means comprising:
means for transmitting a test pulse to an external device;
means for receiving a response pulse from the external device, in response to the test pulse, the response pulse having a predetermined duration, a predetermined polarity, and a predetermined direction for identifying the external device; and
means for establishing a mode of operation for the communication device in response to the response pulse.

10. The communication device of claim 9, further comprising means for applying a supply voltage to the external device to establish a logic one level in the external device.

11. The communication device of claim 10, further comprising means for applying a ground voltage to the external device to establish a logic zero level in the external device.

12. The communication device of claim 11, further comprising radio receiver means coupled to the controller means.

13. The communication device of claim 11, further comprising radio transmitter means coupled to the controller means.

14. A communication system comprising:
an external device; and
a communication device, comprising;
coupler means for coupling the external device to the communication device;
controller means comprising:
at least first and second terminals for receiving digital numbers having zero and one logic states from the external device, each digital number representing a mode of operation for the communication device; and
a means for receiving a response pulse from the external device, the response pulse having a predetermined duration, a predetermined polarity and a predetermined direction for identifying the external device.

15. The communication system of claim 14, wherein the external device comprises:
means for coupling the first and second terminals of the controller means of the communication device to the logic zero state.

16. The communication system of claim 14, wherein the external device comprises:
means for coupling the first terminal of the controller means to the logic one state; and
means for coupling the second terminal of the controller means to the logic zero state.

17. The communication system of claim 14, wherein the controller means comprises:
means for transmitting a test pulse to the external device; and
means for establishing a mode of operation for the communication device in response to the response pulse.

18. The communication system of claim 17 wherein the external device comprises:
pulse generator means for generating the response pulse in response to the test pulse.

19. The communication system of claim 14, further comprising means for applying a ground voltage to the external device to establish a logic zero level in the external device.

20. The communication system of claim 14, further comprising radio receiver means coupled to the controller means.

21. The communication system of claim 14, wherein the communication device further comprises radio transmitter means coupled to the controller means.

* * * * *